July 6, 1943. K. I. ROBINSON ET AL 2,323,727
PIPE CLEANING CUTTER
Filed Oct. 11, 1941
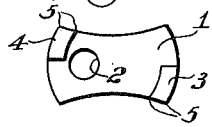
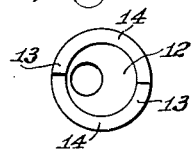
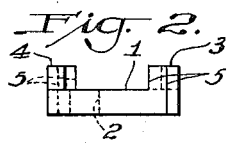
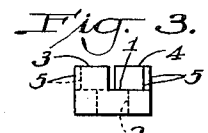
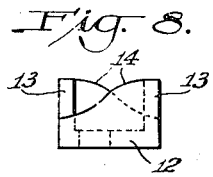
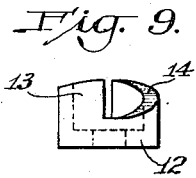
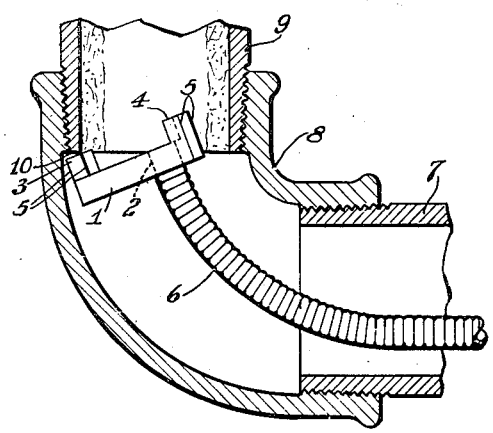
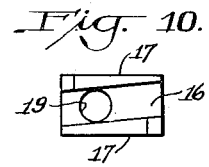
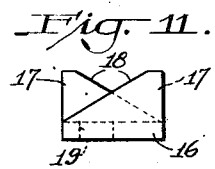
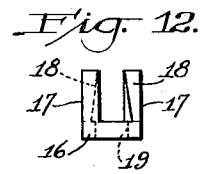
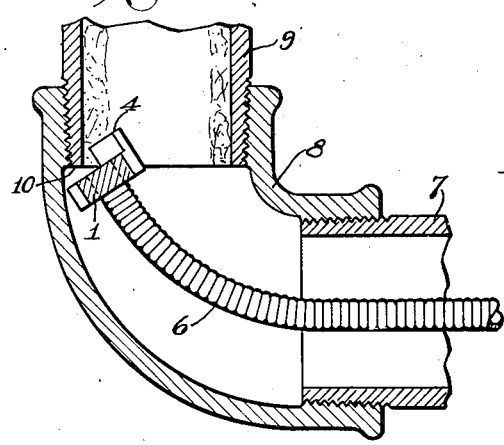
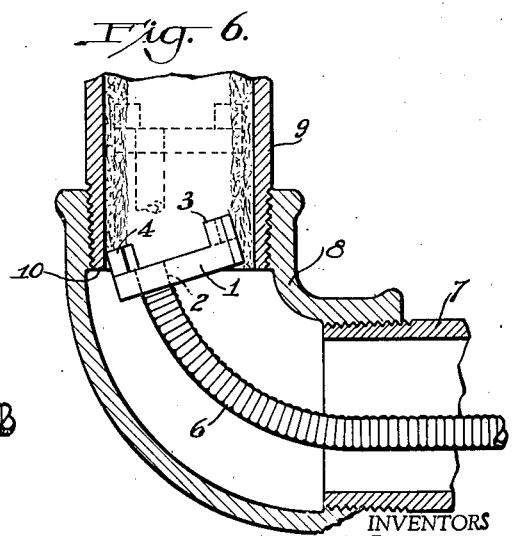
WITNESSES.
A. B. Wallace.
V. A. Peckham.
INVENTORS
Kyle I. Robinson
Lawrence R. Robinson
BY Brown, Critchlow & Flick
their ATTORNEYS.

Patented July 6, 1943

2,323,727

UNITED STATES PATENT OFFICE 2,323,727

PIPE CLEANING CUTTER

Kyle I. Robinson, Bolivar, and Lawrence R. Robinson, Zelienople, Pa., assignors to Pittsburgh Pipe Cleaner Company, Pittsburgh, Pa., a corporation of Pennsylvania Application October 11, 1941, Serial No. 414,637

6 Claims. (Cl. 15—104.09)

This invention relates to rotating cutters for cleaning from the inside of pipes scale, rust, and other deposits, and more particularly to cutters adapted to be driven by rotating flexible cables through pipes having interior shoulders at their bends or elbows.

When two pipes are screwed into the ends of an elbow coupling the inner ends of the pipes form annular shoulders adjacent the opposite ends of the elbow. If an ordinary ball-type of rotating cutter is used for cleaning the pipes it is likely to become wedged in the angle formed by the exposed end surface of the farthest pipe and the encircling elbow. In such a case the cutter not only refuses to enter that pipe but actually may cut a hole through the elbow.

It is among the objects of this invention to provide a pipe cleaning cutter of simple and inexpensive construction which will not stick in a pipe elbow coupling or the like but will enter the pipe connected thereto and proceed through the pipe.

Another object is to provide such a cutter which has adequate cutting surfaces and which will cut regardless of the direction in which it is rotated.

In accordance with this invention a pipe cleaning cutter is provided which is in the form of a body member adapted to be connected to the front end of a rotating flexible cable by which it is driven through the pipes to be cleaned. Rigidly connected to the body portion and projecting forward from its edge is a cutting member for cutting the deposits from the inside of the pipe. Preferably there are at least two of these cutting members, in which case they are disposed at opposite sides or ends of the body member. When the rotating cutter strikes a shoulder in the bend of a pipe, such as the end of a pipe screwed into an elbow, the cutter continues to rotate in that same general position until one of its cutting members strikes the inside of the pipe directly behind the shoulder. Further rotation of the cutter brings the opposite cutting member into the opening in the end of the pipe and then, as both cutting members are inside the pipe, the cutter is free to proceed through the pipe.

The invention is illustrated in the accompanying drawing in which Fig. 1 is a front view of one form of our cutter; Figs. 2 and 3 are side and end views, respectively, thereof; Fig. 4 is a vertical section through an elbow in a pipe line showing the cutter stopped momentarily by a shoulder in the elbow; Fig. 5 shows the cutter in transverse section rotated 90°; Fig. 6 shows the cutter rotated a further 90° or more so that it is free of the shoulder; Figs. 7, 8 and 9 are views similar to Figs. 1, 2 and 3 of a modification of the invention; and Figs. 10, 11 and 12 are similar views of a further embodiment.

Referring to Figs. 1, 2 and 3 of the drawing, a cutter is made in the form of a metal body member 1 which is slightly elongated and provided with concave sides and convex ends. This body member is formed for attachment to the front end of a flexible cable that is adapted to be simultaneously rotated and forced ahead through a pipe in a well known manner. Preferably, the body member is provided with a circular opening 2 for receiving the end of the cable to which the body member can be welded to securely connect it to the cable. By locating this opening off center a whipping action is given to the cutter as it is progressed through a pipe, which produces a better cleaning effect.

Rigidly connected to the ends of the body member 1, preferably by being made integral therewith, are cutting members 3 and 4 that project forward from the edge of the body member. These cutting members start at diametrically opposite corners of the body member and extend about half-way across the ends, and both sides of each cutting member are substantially perpendicular to the body member and provided with sharp edges 5 which serve as the principal cutting edges when the cutter is driven through the pipe. Two of these cutting members are preferred for best operation, although more or less can be used.

In Fig. 4 this cutter is shown attached to the front end of a rotating flexible cable 6 which extends through a pipe 7 threaded into an elbow 8 screwed onto another pipe 9. The cutter has been driven through pipe 7 and has cleaned it, but in passing through the elbow to pipe 9 the cutting member 3 has struck against the shoulder 10 formed by the end pipe 9 which thus momentarily prevents the cutter from moving forward into the pipe. However, as the cutter continues to turn, the other cutting member 4 which, due to the inclination of the cutter to the axis of pipe 9, projects inside the pipe, hooks over the shoulder, i. e., engages the inner surface of the pipe, as shown in Fig. 5. With cutting member 4 fulcruming on the inside of pipe 9, cutting member 3 has to swing inwardly away from shoulder 10, and as soon as it clears the shoulder it enters the pipe as shown in Fig. 6. The entire cutter is then in line with the inside of the pipe and can straighten out and proceed through the pipe as shown by dotted lines in Fig. 6.

Consequently, as the result of the form of our cutter it lifts itself over shoulder 10 and enters pipe 9 in less than one complete revolution. There is no danger of the cutter sticking in or damaging the elbow, and the pipe cleaning proceeds without appreciable interruption. The concave sides of the body member insure against that member striking the end of pipe 9 and knocking the cutter back into the elbow before it can enter the pipe.

The cutter shown in Figs. 7, 8 and 9 is similar to the first one described, but has a cylindrical body portion 12 with each of its cutting members 13 extending substantially half way around it. Each cutting member has a front face perpendicular to the body portion with its outer end connected by an inclined surface 14 to the inner end of the other cutting member's front face.

The form of cutter shown in Figs. 10, 11 and 12 is especially suitable for extremely small pipes where as little metal as possible must be used in the cutter in order to make it small enough to run through a pipe. This cutter has a rectangular body portion 16 along the opposite sides of which the cutting members 17 extend. To provide enough metal for supporting the cutting members they each have a perpendicular front face connected by an inclined surface 18 to the opposite end of the body portion. As shown in Fig. 10, each cutting member is also tapered parallel to the body member so as to provide sufficient space between them for the opening 19 that receives the end of the flexible driving cable.

According to the provisions of the patent statutes, we have explained the principle and construction of our invention and have illustrated and described what we now consider to represent its best embodiment. However, we desire to have it understood that, within the scope of the appended claims, the invention may be practiced otherwise than as specifically illustrated and described.

We claim:

1. A pipe cleaning cutter in the form of a body member formed off center for connection to the front end of a rotating flexible cable, and only two laterally spaced cutting members disposed opposite each other and rigidly connected to said body member and projecting forward from its edge, the outer end of each cutting member being substantially straight in the direction of rotation whereby when the rotating cutter engages a shoulder in a bend of a pipe one of said cutting members will hook over the shoulder and remain in engagement therewith to permit the cutter to lift itself over the shoulder.

2. A pipe cleaning cutter in the form of a body member provided off center with an opening adapted to rigidly receive the front end of a rotating flexible cable, and only two laterally spaced cutting members disposed opposite each other and rigidly connected to said body member and projecting forward from its edge, the forward end of each cutting member having a substantially flat surface whereby when the rotating cutter engages a shoulder in a bend of a pipe one of said cutting members will hook over the shoulder and remain in engagement therewith to permit the cutter to lift itself over the shoulder.

3. A pipe cleaning cutter in the form of an elongated body member adapted to have its rear side connected off center to the front end of a rotating flexible cable, and a cutting member rigidly connected to each end of said body member and projecting forward therefrom, the forward end of each cutting member being substantially flat, whereby when the rotating cutter engages a shoulder in a bend of a pipe one of said cutting members will hook over the shoulder and permit the cutter to lift itself over it, the sides of said body member between said cutting members being concave lengthwise.

4. A pipe cleaning cutter in the form of a generally rectangular body member adapted to have its rear side connected to the front end of a rotating flexible cable, and a cutting member projecting forward from the front of said body at each of two opposite sides thereof, the forward end of each cutting member having at one end of the body member a substantially flat surface approximately parallel to the body member, each cutting member being provided with a surface inclined rearwardly from its said flat surface toward the opposite end of the body member.

5. A pipe cleaning cutter in the form of a generally rectangular body member formed off center for connection to the front end of a rotating flexible cable, and a pair of laterally spaced cutting members projecting forward from the front of said body member at opposite sides thereof, the forward end of each cutting member being inclined rearwardly from a point near one end of the body member toward the opposite end thereof, the forwardmost ends of the cutting members being at opposite ends of the body member and being substantially parallel to the plane of rotation of the cutter.

6. A pipe cleaning cutter in the form of an elongated body member adapted to be connected to the front end of a rotating flexible cable, and only two oppositely disposed cutting members rigidly connected to said body member at the opposite ends thereof and projecting forward from its edge, each cutting member extending only part way across the adjoining end of the body member, the outer end of each cutting member being substantially straight in the direction of rotation whereby when the rotating cutter engages a shoulder in a bend of a pipe one of said cutting members will hook over the shoulder and remain in engagement therewith to permit the cutter to lift itself over the shoulder.

KYLE I. ROBINSON.
LAWRENCE R. ROBINSON.